United States Patent
Suzuki et al.

(10) Patent No.: US 8,256,563 B2
(45) Date of Patent: Sep. 4, 2012

(54) ALL TERRAIN VEHICLE

(75) Inventors: Yasuhiro Suzuki, Shizuoka (JP); Takehiko Arai, Shizuoka (JP); Hiroyuki Fujimoto, Shizuoka (JP); Yasuhiro Oishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 347 days.

(21) Appl. No.: 12/604,423

(22) Filed: Oct. 23, 2009

(65) Prior Publication Data
US 2011/0094818 A1 Apr. 28, 2011

(51) Int. Cl.
*B60K 11/06* (2006.01)

(52) U.S. Cl. .......................................... 180/292; 474/93

(58) Field of Classification Search ................ 180/292, 180/296, 309, 68.1, 339, 68.2, 89.2; D12/196; 474/93
See application file for complete search history.

(56) References Cited

U.S. PATENT DOCUMENTS

| | | | | |
|---|---|---|---|---|
| 5,976,044 A * | 11/1999 | Kuyama | ......................... | 474/93 |
| 7,059,438 B1 * | 6/2006 | Sheets | ......................... | 180/68.1 |
| 7,287,619 B2 * | 10/2007 | Tanaka et al. | ................. | 180/291 |
| 7,363,999 B2 * | 4/2008 | Hastings | ........................ | 180/220 |
| 7,438,147 B2 * | 10/2008 | Kato et al. | .................... | 180/68.1 |
| 7,438,153 B2 * | 10/2008 | Kalsnes et al. | ................. | 180/292 |
| 7,475,748 B2 * | 1/2009 | Nakamura et al. | ............ | 180/68.1 |
| 7,546,892 B2 * | 6/2009 | Lan et al. | ..................... | 180/68.2 |
| 7,690,462 B2 * | 4/2010 | Kato et al. | .................... | 180/68.3 |
| 7,771,299 B2 * | 8/2010 | Mochizuki et al. | ............. | 474/12 |
| 7,967,100 B2 * | 6/2011 | Cover et al. | .................... | 180/312 |
| 8,091,670 B2 * | 1/2012 | Suzuki et al. | ................ | 180/89.2 |
| 2006/0270503 A1 * | 11/2006 | Suzuki et al. | ................. | 474/144 |
| 2009/0050391 A1 * | 2/2009 | Nobuhira | ..................... | 180/219 |
| 2009/0183937 A1 * | 7/2009 | Yamamura et al. | .......... | 180/89.2 |
| 2010/0155170 A1 * | 6/2010 | Melvin et al. | ................. | 180/339 |

* cited by examiner

*Primary Examiner* — J. Allen Shriver, II
*Assistant Examiner* — Emma K Frick
(74) *Attorney, Agent, or Firm* — Keating & Bennett, LLP

(57) ABSTRACT

In an all terrain vehicle, an engine body of an engine unit is positioned along a center line that is perpendicular or substantially perpendicular to a transverse direction of the vehicle. A continuously variable transmission of the engine unit is disposed transversely lateral to the engine body. A center console includes an inner space. The center console is disposed in a transverse center portion of a cabin space. The center console connects a space positioned forward of a front panel and a space positioned under a seat. An intake duct is connected to an upper surface of the engine unit, and extends forward therefrom. The intake duct is at least partially disposed in the interior of the center console. An exhaust duct is connected to the engine unit, and extends rearward therefrom.

7 Claims, 10 Drawing Sheets

ALL TERRAIN VEHICLE

BACKGROUND OF THE INVENTION

1. Field of the Invention

The present invention relates to an all terrain vehicle.

2. Description of the Related Art

US Patent Publication No. US 2006/0270503 A1 discloses an example of a conventional all terrain vehicle in which an engine unit is disposed under a seat. The engine unit includes a continuously variable transmission (CVT). Additionally, an intake duct is connected to the CVT. Air is supplied to the CVT through the intake duct for cooling the CVT.

In the aforementioned vehicle in which the engine unit is disposed under the seat, it is desirable to extend the intake duct forward from the engine unit for enhancing cooling of the CVT. However, a space, positioned in front of the seat, is used for accommodating a driver and/or a passenger (hereinafter simply referred to as a cabin space). Therefore, when the intake duct is extended forward from the engine unit, the cabin space may be reduced for reliably keeping a space for disposing the intake duct.

SUMMARY OF THE INVENTION

In view of the above, preferred embodiments of the present invention provide a continuously variable transmission of an all terrain vehicle that has improved cooling and prevents a reduction in the size of the cabin space and the liberating feeling for a driver and/or a passenger that goes along with a large cabin space.

An all terrain vehicle according to a preferred embodiment of the present invention includes a pair of right and left front wheels, at least a pair of right and left rear wheels, a vehicle body frame, a pair of right and left first roof supports, a pair of right and left second roof supports, a pair of right and left roof members, a seat unit, a front panel, an engine unit, a center console, an intake duct and an exhaust duct. The vehicle body frame supports the front wheels and the rear wheels. The first roof supports are provided at lateral sides of the vehicle body frame in a transverse direction of the vehicle, respectively. Each of the first roof supports includes a pipe member extending in a substantially vertical direction of the vehicle. The second roof supports are provided at the lateral sides of the vehicle body frame in the transverse direction of the vehicle, respectively. The second roof supports are disposed rearward of the first roof supports in a longitudinal direction of the vehicle. Each of the second roof supports includes a pipe member extending in the substantially vertical direction of the vehicle. The right roof member connects an upper portion of the right first roof support and an upper portion of the right second roof support, whereas the left roof member connects an upper portion of the left first roof support and an upper portion of the left second roof support. The seat unit is disposed forward of rear ends of the second roof supports in the longitudinal direction of the vehicle. The front panel is disposed forward of the seat unit in the longitudinal direction of the vehicle. The front panel sections a cabin space and a space above the front wheels. The engine unit includes an engine body and a continuously variable transmission. The engine unit is at least partially disposed under the seat unit. The engine body includes a crank shaft. The engine body is positioned along a center line through a transverse center of the vehicle. The continuously variable transmission is disposed transversely lateral to the engine body. The center console includes an inner space. The center console is disposed in a transverse center portion of the cabin space. The center console connects a space positioned forward of a front panel and a space positioned under the seat unit. The intake duct is connected to an upper surface of the engine unit, and extends forward therefrom in the longitudinal direction of the vehicle. The intake duct is at least partially disposed in the interior of the center console. The intake duct is configured to provide external air into the interior of the continuously variable transmission. The exhaust duct is connected to the engine unit, and extends rearward therefrom in the longitudinal direction of the vehicle. The exhaust duct is configured to discharge air from the interior of the continuously variable transmission to the outside.

According to a preferred embodiment of the present invention, the engine body is at least partially disposed under the seat unit. With this structure, it is possible to reduce the size of the vehicle. Additionally, the intake duct extends forward from the upper surface of the engine unit. With this structure, it is possible to enhance cooling of the continuously variable transmission. Moreover, the intake duct is at least partially disposed in the interior of the center console. The center console is disposed in the transverse center portion of the cabin space. With this structure, it is possible to inhibit reduction of the cabin space due to the space for disposing the intake duct.

As described above, preferred embodiments of the present invention improve the cooling of the continuously variable transmission while preventing a reduction in the size of the cabin space and the liberating feeling for a driver and/or a passenger that goes along with a large cabin space.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
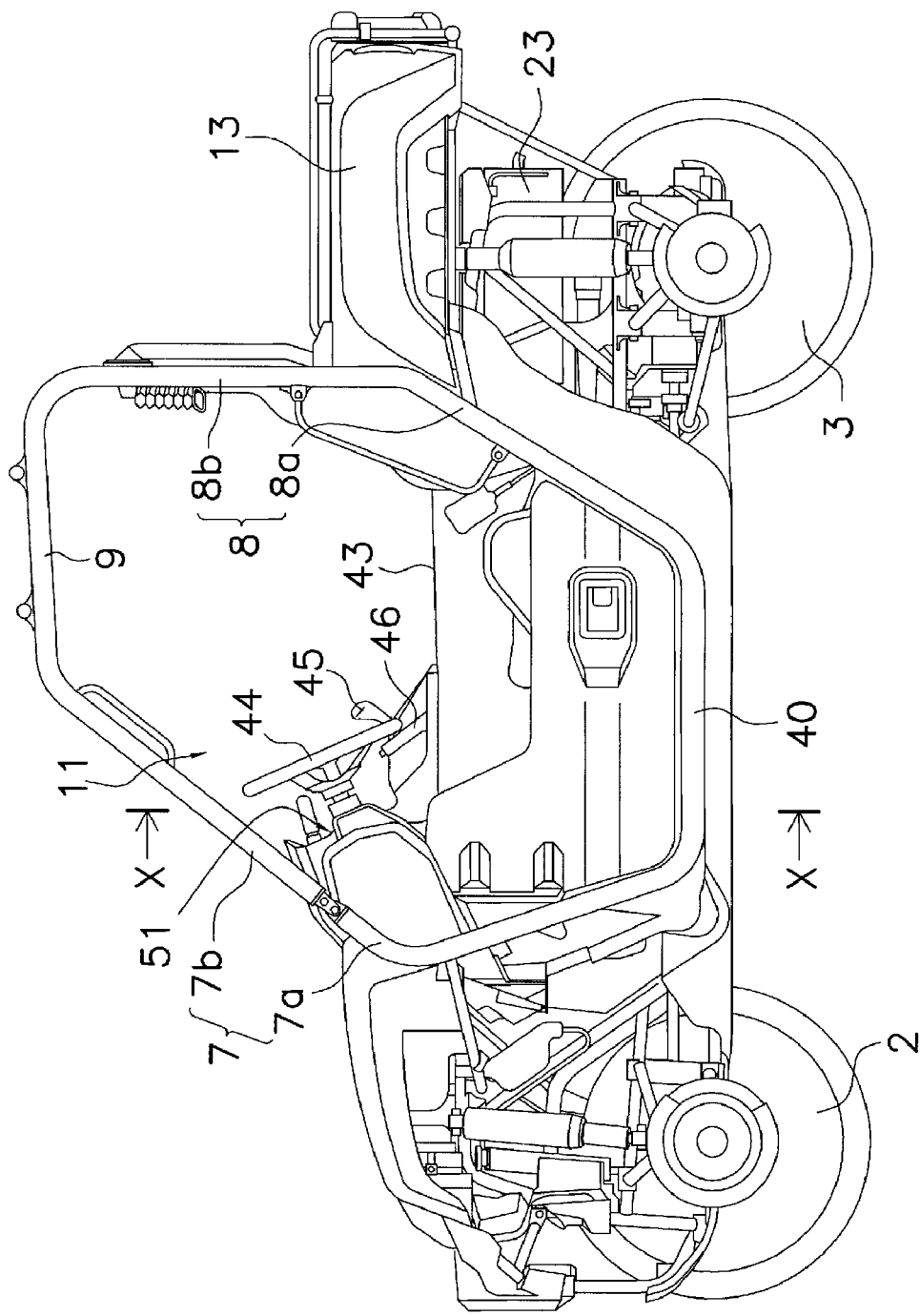
FIG. 1 is a side view of an all terrain vehicle.
Figure 2:
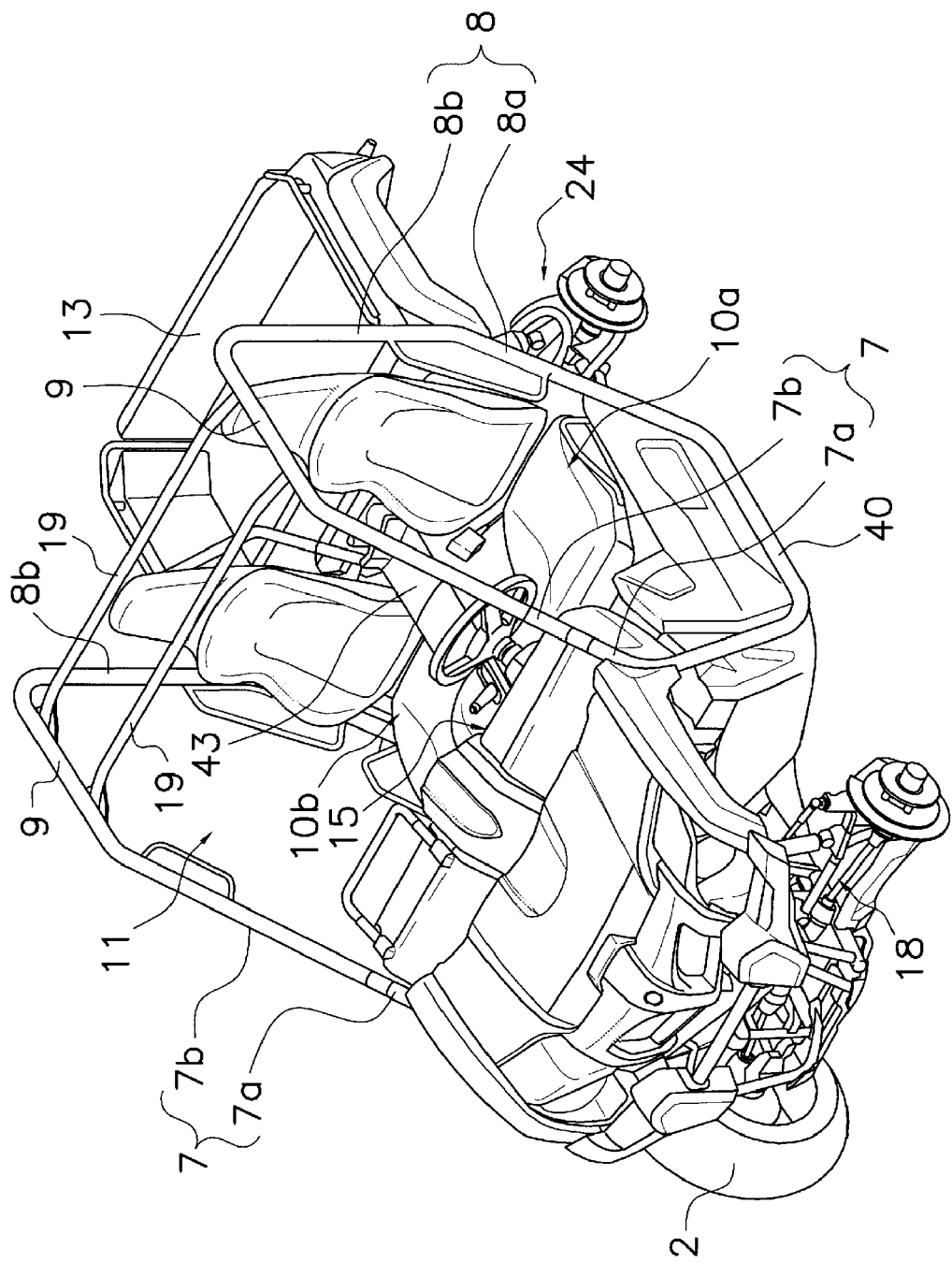
FIG. 2 is a perspective view of appearance of the all terrain vehicle.

An all terrain vehicle according to preferred embodiments of the present invention will be hereinafter explained with reference to the attached figures. FIGS. 1 and 2 illustrate the all terrain vehicle in which a left front wheel and a left rear wheel are removed. In the present specification, directional terms "front", "rear", "right" and "left" and their related terms mean directions seen in a condition in which a driver and/or a passenger take a seat, excluding special occasions. Similarly, a term "longitudinal direction" means a front-to-rear direction of the vehicle in the condition in which a driver and/or a passenger take a seat. On the other hand, a term "transverse direction" means a right-to-left direction of the vehicle in the condition in which a driver and/or a passenger take a seat.

The all terrain vehicle, illustrated in FIGS. 1 to 5, includes a pair of right and left front wheels 2, a pair of right and left rear wheels 3, a vehicle body frame 4, an engine unit 5, a power transmission mechanism 6, and roof forming members. The vehicle body frame 4 supports the front wheels 2 and the rear wheels 3. The roof forming members preferably include a pair of first roof supports 7, a pair of second roof supports 8, and a pair of roof members 9. Additionally, the all terrain vehicle includes a cabin 11, a front space 12 (see FIG. 4) and a back space 14 (see FIG. 4). The cabin 11 functions as an accommodation space for a driver and/or a passenger. Seats 10a and 10b are disposed in the interior of the cabin 11. The front space 12 includes the front wheels 2. The front space 12 is disposed forward of the cabin 11. The back space 14 includes the rear wheels 3, and a cargo 13 is disposed above the backspace 14. The back space 14 is disposed rearward of the seats 10a and 10b. A front panel 15 is disposed between the cabin 11 and the front space 12. The cabin 11 and the front space 12 are thus sectioned apart by the front panel 15.

Figure 4:
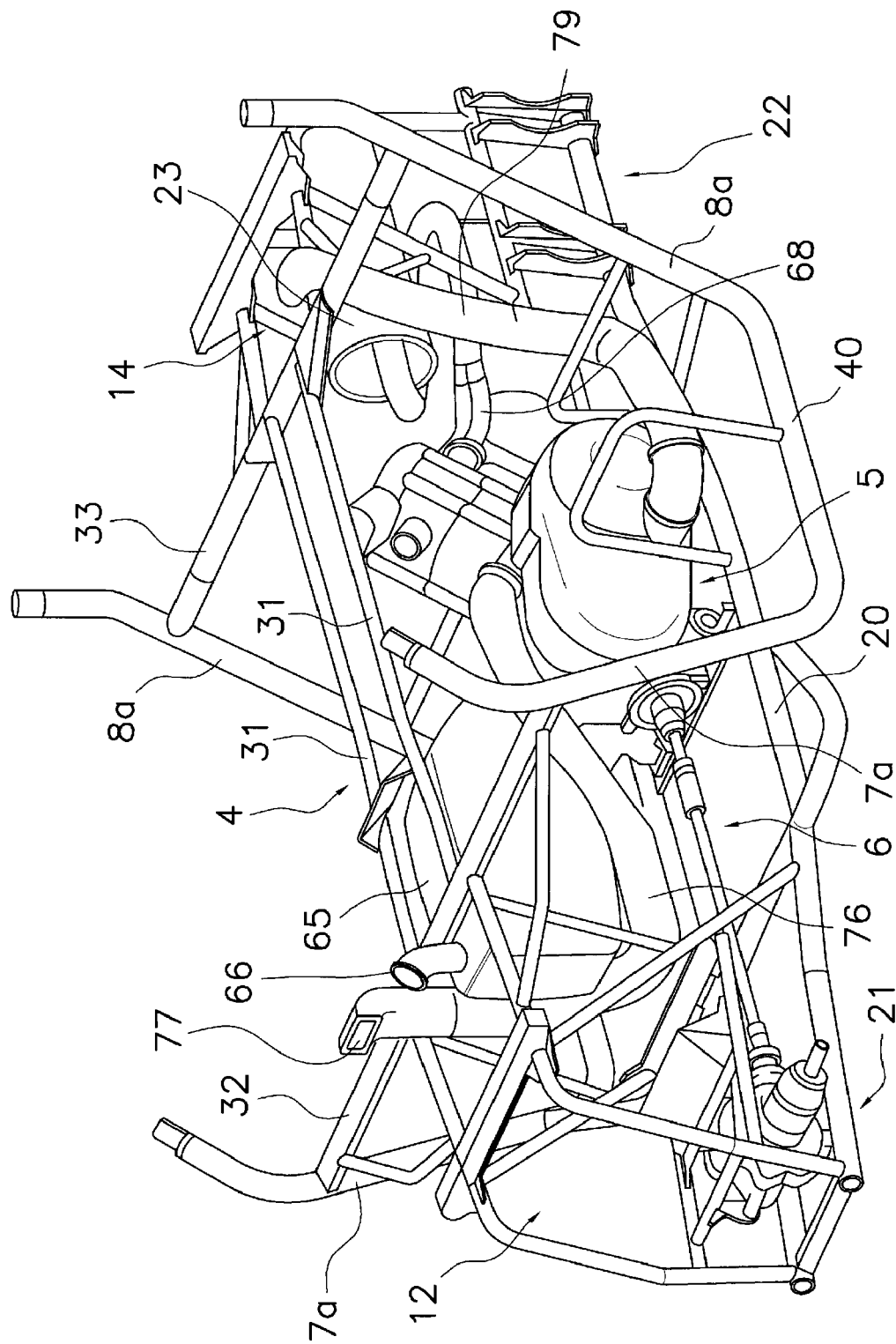
FIG. 4 is a perspective view of a vehicle body frame and main members supported by the vehicle body frame, taken out of the all terrain vehicle.
Figure 5:
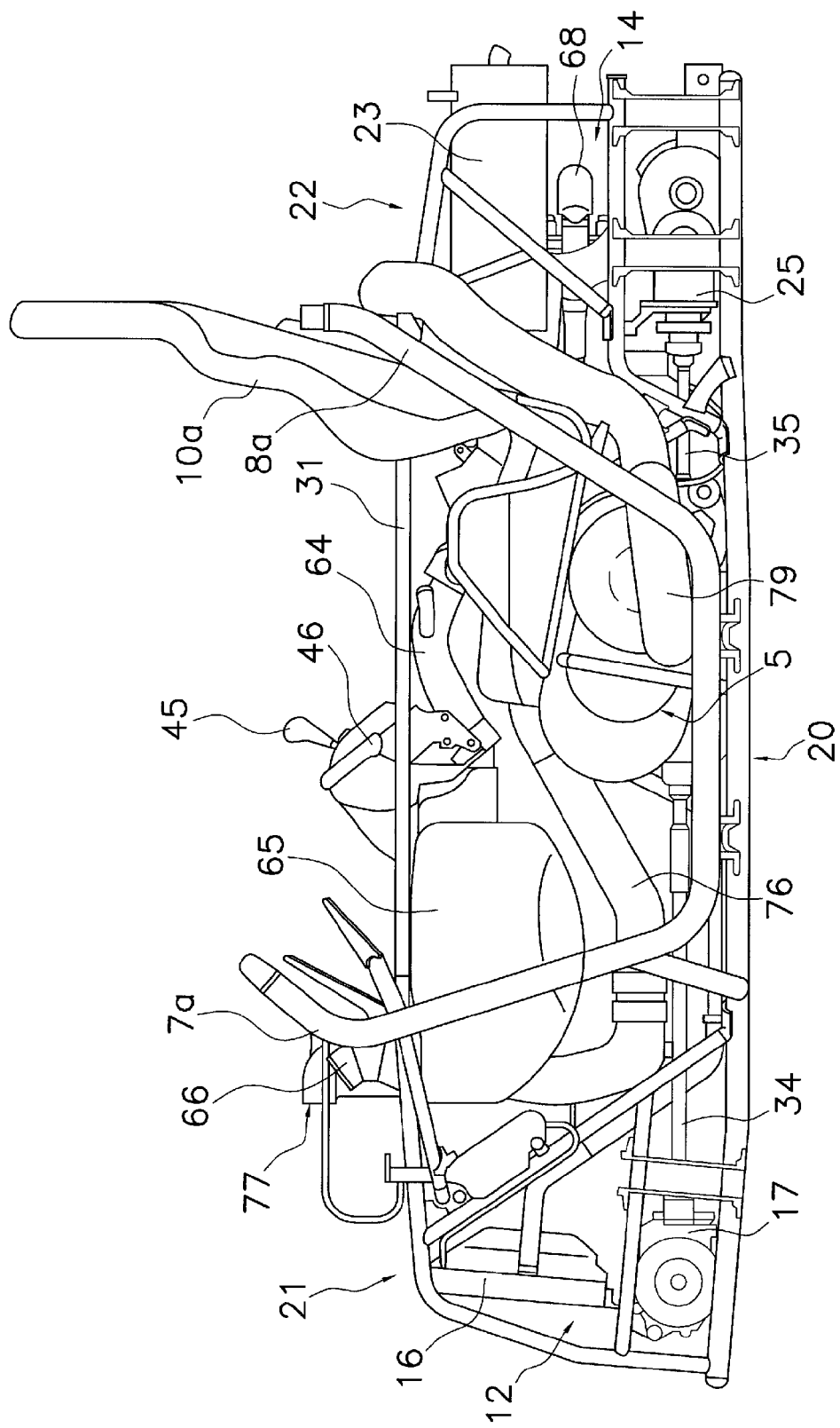
FIG. 5 is a side view of the vehicle body frame and the main members.

As illustrated FIGS. 4 and 5, the vehicle body frame 4 mainly includes a center frame unit 20, a front frame unit 21 and a rear frame unit 22. The center frame unit 20 is positioned at the bottom of the cabin 11. The front frame unit 21 is disposed in front of the center frame unit 20. The front frame unit 21 defines a front section of the vehicle. On the other hand, the rear frame unit 22 is disposed behind the center frame unit 20. The rear frame unit 22 defines a rear section of the vehicle.

The center frame unit 20 preferably includes a plurality of pipe members. The engine unit 5 is supported by the center frame unit 20 through engine brackets (not illustrated in the figure). A pair of intermediate frames 31 is disposed above the center frame unit 20. Each of the intermediate frames 31 is a pipe member extending in a longitudinal direction of the vehicle. The intermediate frames 31 are disposed in approximately transverse center in the interior of the cabin 11. The intermediate frames 31 are disposed between the seats 10a and 10b in the transverse direction of the vehicle. Additionally, the intermediate frames 31 are transversely separated from each other.

Similarly to the center frame unit 20, each of the front frame unit 21 and the rear frame unit 22 preferably includes a plurality of pipe members. The front frame unit 21 supports a variety of components such as a radiator 16, a front gear case 17 and a front suspension mechanism 18 (see FIG. 2). On the other hand, the rear frame unit 22 supports a variety of components, such as a muffler 23, a rear suspension mechanism 24 and a rear gear case 25 (see FIG. 2).

Figure 6:
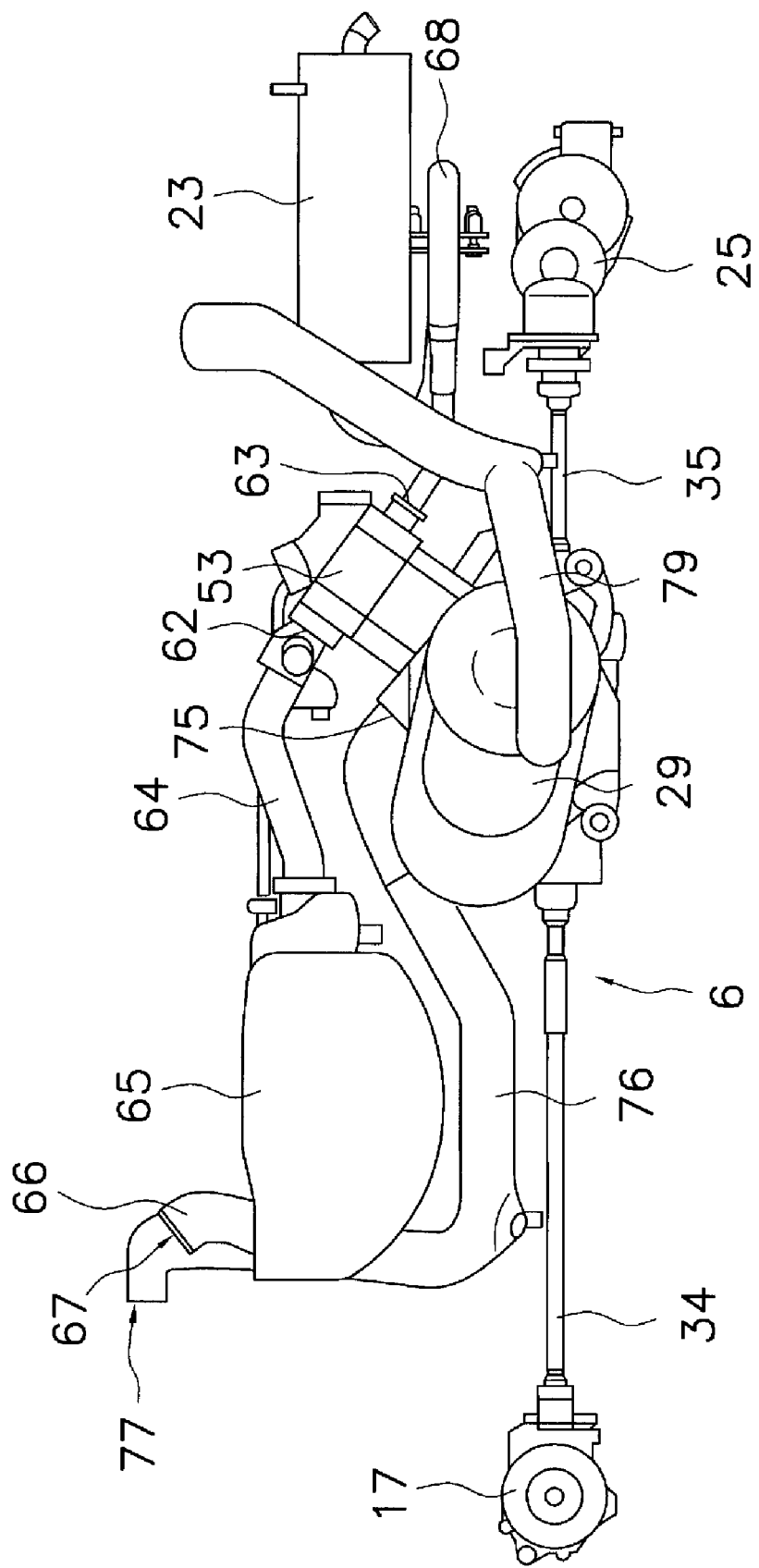
FIG. 6 is a top view of the vehicle body frame and main members supported by the vehicle body frame, taken out of the all terrain vehicle.
Figure 7:
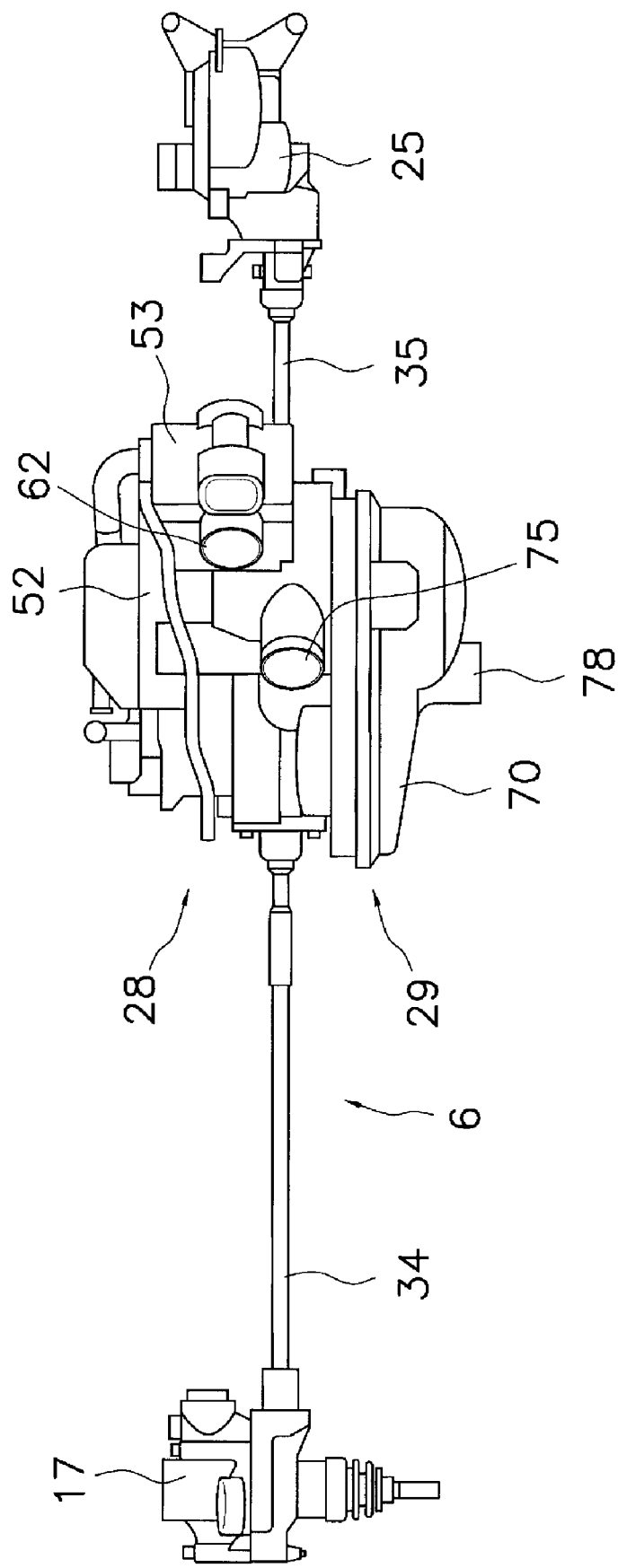
FIG. 7 is a top view of the engine unit in which intake-exhaust related mechanism is removed.

As described above, the engine unit 5 is supported by the center frame unit 20 through the engine brackets. As illustrated in FIGS. 6 and 7, the engine unit 5 includes an engine body 28 and a V-belt continuously variable transmission 29. The continuously variable transmission (CVT) 29 is disposed on the left side of the engine body 28. The engine body 28, the CVT 29 and the intake-exhaust related mechanism connected to the engine unit 5 will be hereinafter explained in detail.

The power transmission mechanism 6 includes a front drive shaft 34, a rear drive shaft 35, a front gear case 17 and a rear gear case 25. The front drive shaft 34 and the rear drive shaft 35 are connected to the output side of the engine unit 5.

The front gear case 17 is disposed among the tip of the front drive shaft 34 and the pair of the front wheels 2, whereas the rear gear case 25 is disposed among the tip of the rear drive shaft 35 and the pair of the rear wheels 3. The power transmission mechanism 6 is configured to transmit driving force of the engine unit 5 to the pair of the front wheels 2 and the pair of the rear wheels 3.

Figure 3:
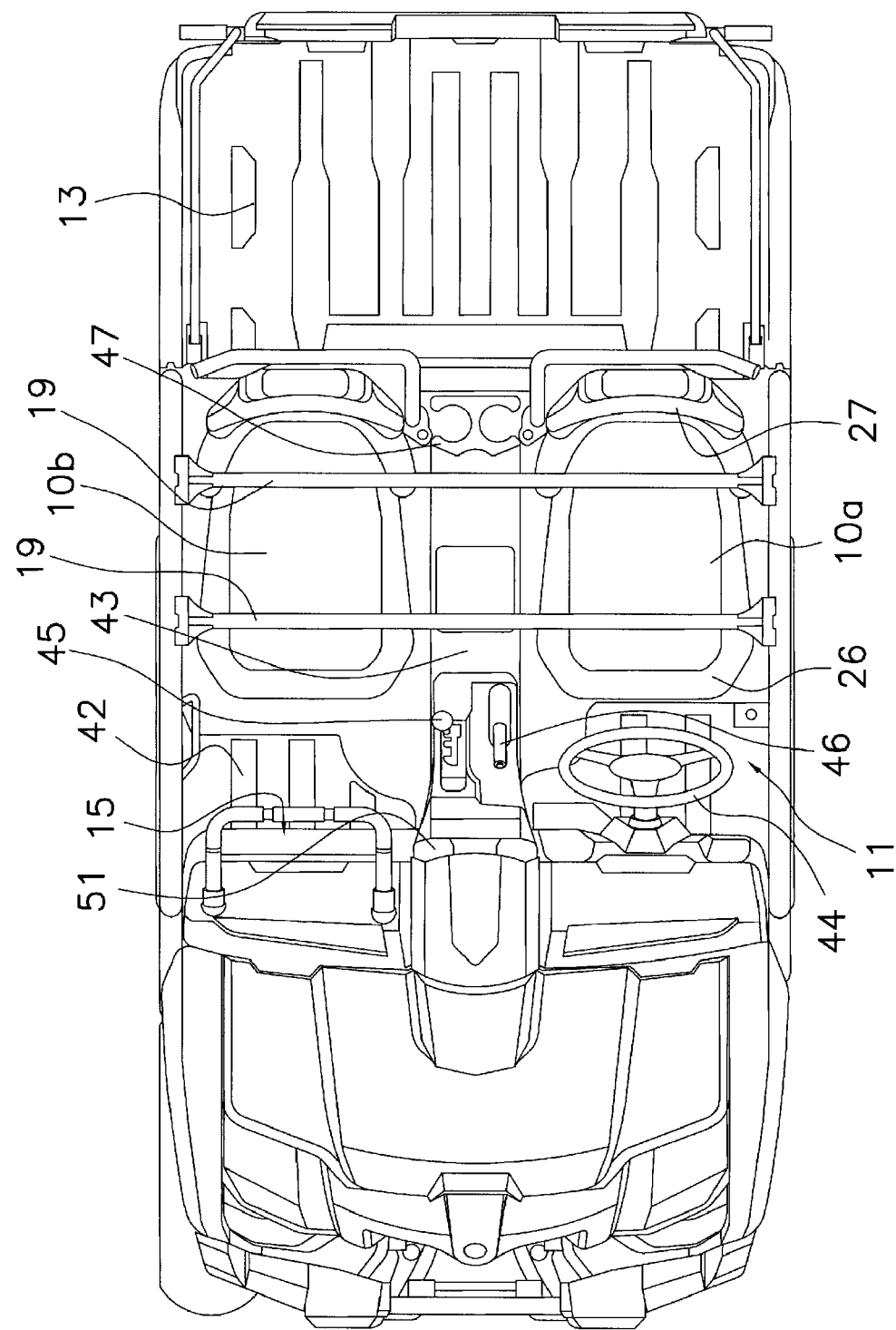
FIG. 3 is a top view of the all terrain vehicle.

As illustrated in FIGS. 1 to 3, the pair of right and left first roof supports 7, the pair of right and left second roof supports 8 and the pair of right and left roof members 9 define a pair of right and left lateral frames of the cabin 11.

The first roof supports 7 define the front ends of the pair of right and left lateral portions of the cabin 11. Each of the first roof supports 7 preferably includes a pipe member extending in the vertical direction. The term "vertical direction" herein is not limited to an exactly perpendicular direction to the horizontal direction, and may be a substantially vertical direction. For example, a component "extending in the vertical direction" may extend in an oblique direction or may be formed in a curved shape. Each of the first roof supports 7 is preferably divided into a lower support 7a and an upper support 7b. The lower support 7a and the upper support 7b are coupled preferably by a single or plurality of bolts, for example. The coupling portion between the lower support 7a and the upper support 7b is positioned at approximately the same height as the upper end of the front panel 15. The lower support 7a slants forward from its lower end to its upper end (i.e., its coupling portion with the upper support 7b). On the other hand, the upper support 7b slants rearward from its lower end (i.e., its coupling portion with the lower support 7a) to its upper end.

Additionally, as illustrated in FIG. 4, a first lateral frame 32 bridges the right and left first roof supports 7. The first lateral frame 32 is a pipe member extending in the transverse direction of the vehicle. The first lateral frame 32 is coupled to the lower supports 7a of the right and left first roof supports 7. Additionally, the aforementioned front frame unit 21 is coupled to the first lateral frame 32. Moreover, the front ends of the aforementioned intermediate frames 31 are coupled to the first lateral frame 32. The front ends of the intermediate frames 31 are welded to the first lateral frame 32.

The second roof supports 8 define the rear ends of the pair of right and left lateral portions of the cabin 11. Each of the second roof supports 8 preferably includes a pipe member extending in the vertical direction. The second roof supports 8 are disposed rearward of the first roof supports 7. Similarly to the first roof supports 7, each of the second roof supports 8 is divided into a lower support 8a and an upper support 8b. The lower support 8a and the upper support 8b are coupled preferably by a single or plurality of bolts, for example. The coupling portion between the lower support 8a and the upper support 8b is positioned at approximately the same height as the upper end of the front panel 15. The lower support 8a slants rearward from its lower end to its upper end (i.e., its coupling portion with the upper support 8b). On the other hand, the upper support 8b is disposed approximately-upright in the vertical direction.

Additionally, as illustrated in FIG. 4, a second lateral frame 33 bridges the right and left second roof supports 8. The second lateral frame 33 is a pipe member extending in the transverse direction of the vehicle. The second lateral frame 33 is coupled to the lower supports 8a of the second roof supports 8. Additionally, the aforementioned rear frame unit 22 is coupled to the second lateral frame 33. Furthermore, the rear ends of the aforementioned intermediate frames 31 are coupled to the second lateral frame 33. The rear ends of the intermediate frames 31 are welded to the second lateral frame 33.

Each of the roof members 9 preferably includes a pipe member extending in the longitudinal direction. The right/left roof member 9 connects an upper portion of the right/left first roof support 7 and an upper portion of the right/left second roof support 8. The roof members 9 are disposed in an approximately horizontal direction. Additionally, as illustrated in FIGS. 2 and 3, beam members 19 bridge the right and left roof members 9. Each of the beam members 19 preferably includes a pipe member extending in the transverse direction of the vehicle. The beam members 19 are coupled to the roof members 9.

The right and left lateral frames of the cabin 11 further include a pair of right and left lower members 40 in addition to the first roof supports 7, the second roof supports 8 and the roof members 9. Each of the lower members 40 preferably includes a pipe member. The right/left lower member 40 connects the lower end of the right/left first roof support 7 and the lower end of the right/left second roof support 8. The lower members 40 are disposed in an approximately horizontal direction. Accordingly, the lower members 40 are opposed to the roof members 9 in the vertical direction.

In the present preferred embodiment, the right/left upper support 7b of the right/left first roof support 7, the right/left upper support 8b of the right/left second roof support 8 and the right/left roof member 9 are formed preferably by bending apiece of a pipe member. Similarly, the right/left lower support 7a of the right/left first roof support 7, the right/left lower support 8a of the right/left second roof support 8 and the right/left lower member 40 are formed preferably by bending apiece of a pipe member.

As illustrated in FIG. 3, the cabin 11 is provided with the front panel 15, a bottom floor panel 42, a center console 43 and the seats 10a and 10b. A handle 44 is provided in front of the left seat 10a within the cabin 11. The seat 10a preferably includes a seating surface 26 and a seat back 27. On the other hand, the seat 10b is disposed lateral to the seat 10a in the transverse direction of the vehicle. The seat 10b has approximately the same structure as the seat 10a. Each of the seats 10a and 10b is disposed forward of the rear ends of the second roof supports 8 within the cabin 11. More specifically, a portion of the seat back 27 overlaps with the second roof supports 8 in the longitudinal direction of the vehicle and the other portion of the seat back 27 is positioned rearward of the second roof supports 8. However, the seating surface 26 is preferably positioned forward of the rear ends of the second roof supports 8.

Figure 10:
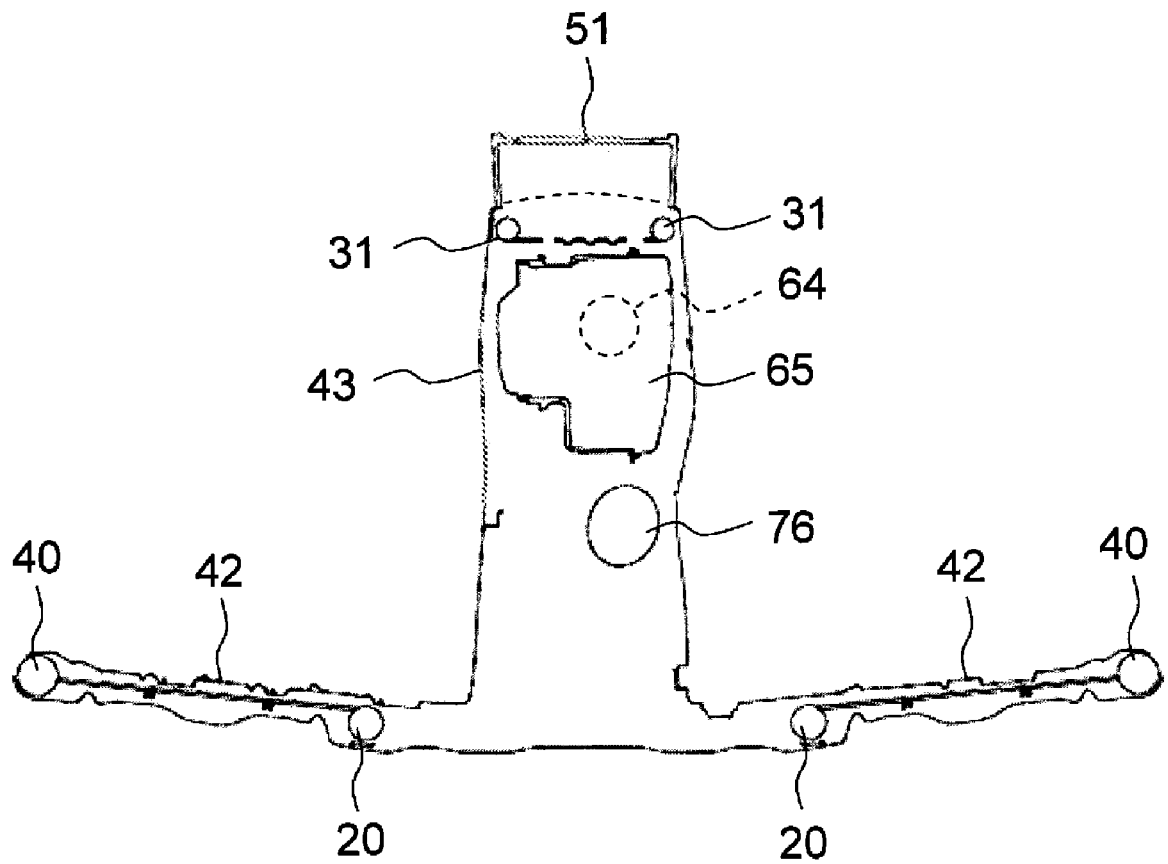
FIG. 10 is a schematic cross-sectional view of the all terrain vehicle of FIG. 1, sectioned along a section line IX-IX.

Furthermore, the center console 43 is disposed in an approximately transverse center of the cabin 11. In other words, the center console 43 is disposed between the right and left seats 10b and 10a. The center console 43 preferably includes an inverse U-shaped panel, and thereby includes an inner space (see FIG. 10). Note FIG. 10 is a schematic cross-sectional view of the all terrain vehicle of FIG. 1, sectioned along a section line X-X. In FIG. 10, illustration of some components is omitted. The center console 43 is disposed for covering the above and the lateral of the aforementioned intermediate frames 31. The center console 43 connects a space positioned forward of the front panel 15 and a space positioned under the seats 10a and 10b.

Note a speed change control lever 45 and a side brake control lever 46 are disposed in the front portion of the center console 43, whereas a bottle receiver 47 is disposed on the rear portion of the center console 43 for receiving a single or plurality of beverage bottles.

As described above, the front panel 15 is a member that is arranged to section the cabin 11 and the front space 12 positioned in front of the cabin 11. The front panel 15 is disposed in front of the seats 10a and 10b. The front panel 15 extends continuously upward from a front portion of the floor panel 42 of the cabin 11. The handle 44 is provided in the left upper portion of the front panel 15, whereas a meter unit 51, including a speedometer and the like, is disposed in the transverse center portion of the front panel 15.

Figure 8:
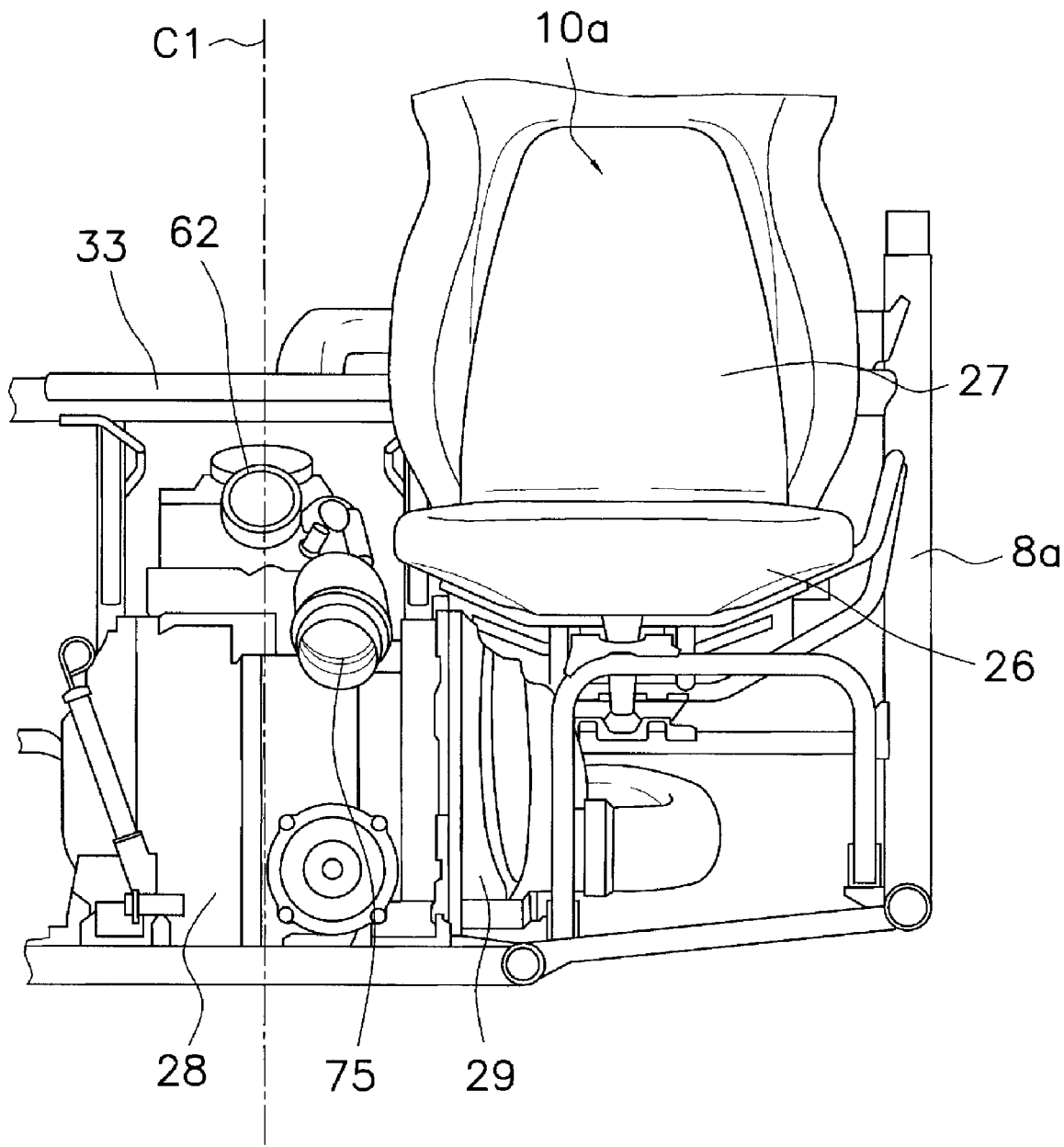
FIG. 8 is a front view for illustrating disposition of the engine unit and a seat.
Figure 9:
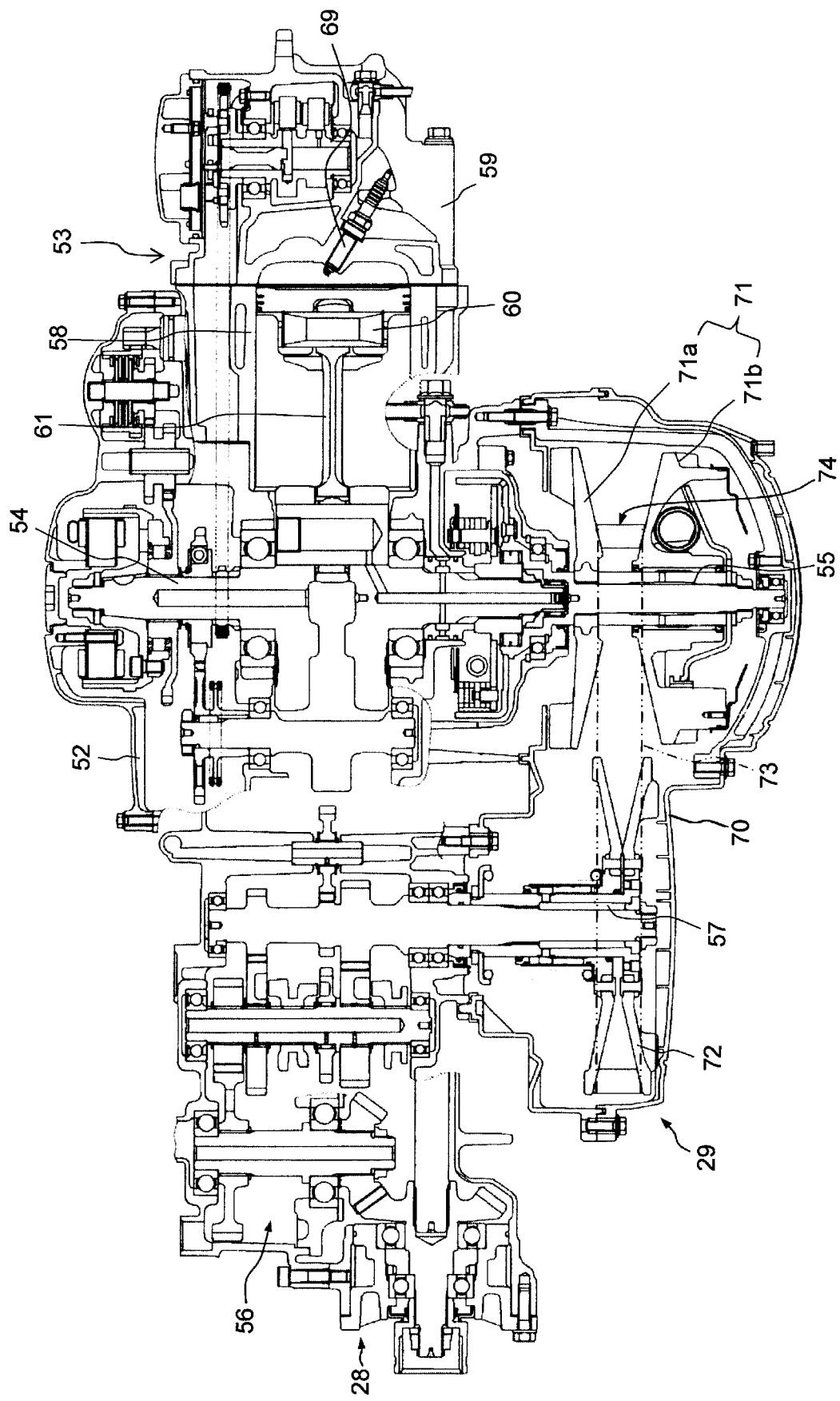
FIG. 9 is a cross-sectional view of the engine unit.

The structure of the engine unit 5 will be hereinafter explained in detail. As illustrated in FIGS. 6 and 7, the engine unit 5 includes the engine body 28 and the CVT 29. Additionally, as illustrated in FIG. 8, the engine body 28 is positioned in a center line (see a dashed-dotted line C1) through a transverse center of the vehicle. The left portion of the engine body 28 is positioned under the seat 10a. Moreover, as illustrated in FIG. 9, the engine body 28 includes a crank case 52 and a cylinder portion 53.

The crank case 52 accommodates a crank shaft 54 horizontally extending in the transverse direction of the vehicle. The crank shaft 54 is coupled to a primary pulley shaft 55 of the CVT 29 to be described. Additionally, the crank case 52 accommodates a speed reduction mechanism 56. The speed reduction mechanism 56 includes a plurality of gears. The speed reduction mechanism 56 is disposed forward of the crank shaft 54. The speed reduction mechanism 56 is coupled to a secondary pulley shaft 57 of the CVT 29 to be described. The speed reduction mechanism 56 is configured to transmit power of the CVT 29 to the power transmission mechanism 6 (see FIGS. 6 and 7).

The cylinder portion 53 is disposed above the crank case 52. The cylinder portion 53 includes a cylinder 58 and a cylinder head 59. A piston 60 is disposed in the cylinder 58. The piston 60 is coupled to the crank shaft 54 through a con rod 61. The cylinder head 59 includes an inner space arranged to communicate with the inner space of the cylinder 58 in which the piston 60 is disposed. Additionally, an ignition plug 69 is inserted into the cylinder head 59. As illustrated in FIGS. 6 and 7, the cylinder head 59 is provided with an engine intake port 62 and an engine exhaust port 63. The engine intake port 62 and the exhaust port 63 communicate with the interior space of the cylinder head 59.

The engine intake port 62 is provided in the front surface of the cylinder head 59. The front surface of the cylinder head 59 slants rearward from its lower side to its upper side. As illustrated in FIG. 8, the engine intake port 62 is positioned between the right and left seats 10b and 10a in the transverse direction of the vehicle. Additionally, the engine intake port 62 is positioned in the interior of the center console 43. As illustrated in FIGS. 4 to 6, an engine intake duct 64 is connected to the engine intake port 62 for introducing external air into the interior of the engine body 28. The engine intake duct 64 extends forward along the center console 43 in the interior of the center console 43. Additionally, the engine intake duct 64 is connected to an air cleaner 65. The air cleaner 65 is disposed in the interior of the center console 43. An intake pipe 66 is connected to the front portion of the upper surface of the air cleaner 65. The intake pipe 66 extends upward from the upper surface of the air cleaner 65, and is bent rearward. The intake pipe 66 is positioned forward of the first lateral frame 32. Additionally, an inlet 67 is provided in the tip of the intake pipe 66.

The engine exhaust port 63 is provided in the rear surface of the cylinder head 59. The rear surface of the cylinder head 59 slants rearward from its lower side to its upper side. An engine exhaust pipe 68 is connected to the engine exhaust port 63 for discharging air to the outside from the interior of the engine body 28. The engine exhaust pipe 68 extends rearward from the engine exhaust port 63, and is folded forward in the back space 14. The engine exhaust pipe 68 is connected to the muffler 23 disposed in the rear frame unit 22.

The CVT 29 is disposed on the left side of the engine body 28. As illustrated in FIG. 8, the CVT 29 is disposed under the seat 10a. As illustrated in FIG. 9, the CVT 29 includes a transmission case 70. The transmission case 70 is attached to the left surface of the crank case 52. The transmission case 70 accommodates the primary pulley shaft 55 as a driving shaft, a primary pulley 71, the secondary pulley shaft 57 as a driven shaft, and a secondary pulley 72. The primary pulley shaft 55 is coupled to the crank shaft 54. The primary pulley shaft 55 is configured to revolve with the crank shaft 54. The primary pulley 71 is supported by the primary pulley shaft 55. The primary pulley 71 includes a fixed pulley body 71a and a movable pulley body 71b. The fixed pulley body 71a is fixed to the primary pulley shaft 55, whereas the movable pulley body 71b is capable of moving in an axial direction of the primary pulley shaft 55. The fixed pulley body 71a and the movable pulley body 71b define a belt groove 74. The cross-sectional shape of the belt groove 74 is a roughly V-shaped. A belt 73 is wrapped around the belt groove 74. Width of the belt groove 74 is configured to be changed in conjunction with displacement of the movable pulley body 71b relative to the fixed pulley body 71a. The secondary pulley shaft 57 is disposed forward of the primary pulley shaft 55. The secondary pulley 72 is disposed forward of the primary pulley 71. The secondary pulley 72 is supported by the secondary pulley shaft 57. Revolution of the primary pulley shaft 55 is transmitted to the secondary pulley shaft 57 via the primary pulley 71, the belt 73 and the secondary pulley 72.

As illustrated in FIGS. 6 and 7, an intake port 75 is provided in the upper surface of the aforementioned crank case 52. As illustrated in FIG. 8, the intake port 75 is disposed between the right and left seats 10b and 10a in the transverse direction of the vehicle. Additionally, the intake port 75 is positioned in the interior of the center console 43. Additionally, the intake port 75 is disposed between the primary pulley shaft 55 and the secondary pulley shaft 57 in the longitudinal direction of the vehicle. The intake port 75 is also disposed between the cylinder 58 and the primary pulley 71 in the transverse direction of the vehicle.

An intake duct 76 is connected to the intake port 75 for introducing external air into the interior of the CVT 29. The intake duct 76 extends forward from the upper surface of the crank case 52. The intake duct passes through the interior of the center console 43. The intake duct 76 vertically overlaps with the engine intake duct 64 in the interior of the center console 43 (see FIG. 10). The intake duct 76 passes through a space below the air cleaner 65. The intake duct 76 is bent upward from the position below the air cleaner 65. The intake duct 76 passes through the right side of the air cleaner 65 in the front frame unit 21. Additionally, the intake duct 76 extends to a position higher than the air cleaner 65. An inlet 77 is provided in the tip of the intake duct 76. The inlet 77 is disposed forward of the first lateral frame 32 and the front panel 15.

As illustrated in FIG. 7, an exhaust port 78 is provided in the left surface of the aforementioned transmission case 70. The exhaust port 78 is disposed between the primary pulley shaft 55 and the secondary pulley shaft 57 in the longitudinal direction of the vehicle.

As illustrated in FIG. 6, an exhaust duct 79 is connected to the exhaust port 78 for discharging air to the outside from the interior of the CVT 29. The exhaust duct 79 extends rearward from the left surface of the transmission case 70. As illustrated in FIG. 5, the exhaust duct 79 is bent transversely inward in a position rearward of the seat 10a. Additionally, the exhaust duct 79 extends upward in a position behind the seat 10a. The exhaust duct 79 passes through behind the seat 10a and the left side of the rear frame unit 22 and extends to a position higher than the muffler 23. An outlet is provided in the tip of the exhaust duct 79. The outlet is opposed to the space above the muffler 23. Accordingly, it is possible to cool the space adjacent to the muffler 23 by the air discharged from the outlet of the exhaust duct 79.

According to the all terrain vehicle of the present preferred embodiment, the engine unit 5 is mostly disposed in a lower position than the seating surface 26 of the seat 10a. Additionally, the left portion of the engine body 28 and the CVT 29 are disposed under the seat 10a. With the structure, it is possible to compactly form the vehicle.

Additionally, the intake duct 76 extends forward from the upper surface of the engine body 28. With this structure, it is possible to easily intake air into the intake duct 76. As a result, it is possible to enhance cooling of the CVT 29.

Moreover, the intake duct 76 is disposed in the interior of the center console 43. With the structure, it is possible to inhibit reduction of the cabin space due to a space provided for disposing the intake duct 76. The center console 43 is preferably disposed between the right and left seats 10b and 10a. Therefore, a driver and/or a passenger have little chance to feel oppression due to disposition of the center console 43.

Furthermore, the intake duct 76 is connected to the upper surface of the engine body 28, and the center console 43 covers above the engine body 28. In other words, a bent portion of the intake duct 76 is disposed in the interior of the center console 43. In general, a large space is necessary for accommodating an intake duct including a bent portion. According to the present preferred embodiment, however, the bent portion of the intake duct 76 is disposed in the interior of the center console 43. Therefore, it is possible to inhibit reduction of the cabin space.

Also, even when the intake duct 76 has a gently bent shape, there is little chance to reduce the cabin space. This is because the bent portion of the intake duct 76 is disposed in the interior of the center console 43. Therefore, it is possible to reduce ventilation resistance within the intake duct 76 by forming the intake duct 76 in a gently bent shape. As a result, it is possible to enhance cooling of the CVT 29.

As described above, the all terrain vehicle of the present preferred embodiment is simultaneously capable of enhancing cooling of the CVT 29 and preventing a reduction in the liberating feeling of a driver and/or a passenger.

According to the all terrain vehicle of the present preferred embodiment, the intake duct 76 and the engine unit 5 are connected in a position between the cylinder 58 and the primary pulley 71 in the transverse direction of the vehicle. Therefore, the intake duct 76 is connected to the engine unit 5 in a closer position to the transverse center of the vehicle than the structure in which the intake duct 76 is connected to the lateral surface of the engine init 5. With this structure, it is possible to dispose the intake duct 76 in the interior of the center console 43 while enlargement of the transverse dimension of the center console 43 is prevented. As a result, it is possible to reliably maintain the comfort of a driver and/or a passenger.

According to the all terrain vehicle of the present preferred embodiment, the intake duct 76 and the engine unit 5 are connected in a position between the right and left seats 10b and 10a. With the structure, it is possible to prevent positional elevation of the seats 10a and 10b. As a result, it is possible to reliably maintain the comfort of a driver and/or a passenger.

According to the all terrain vehicle of the present preferred embodiment, the intake duct 76 and the engine unit 5 are connected in a position between the primary pulley shaft 55 and the secondary pulley shaft 57 in the longitudinal direction of the vehicle. Therefore, it is possible to form the intake duct 76 to have a gently curved shape, compared to the structure in which the intake duct 76 and the engine unit 5 are connected in a position forward of the secondary pulley shaft 57. With the structure, it possible to reduce ventilation resistance within the intake duct 76. As a result, it is possible to enhance cooling of the CVT 29.

According to the all terrain vehicle of the present preferred embodiment, the engine intake duct 64 and the intake duct 76 overlap one above the other within the center console 43. With the structure, it is possible to compactly form the center console 43. Therefore, it is possible to prevent any reduction of the cabin space due to disposition of the center console 43. As a result, it is possible to reliably maintain the comfort of a driver and/or a passenger of the vehicle.

According to the all terrain vehicle of the present preferred embodiment, the inlet 77 of the intake duct 76 is disposed forward of the front panel 15. With the structure it is possible to easily intake air into the intake duct 76. As a result, it is possible to further enhance cooling of the CVT 29.

The specific structure and disposition of the all terrain vehicle of the present invention are not limited to the aforementioned preferred embodiment. They are allowed to be changed without departing from the scope of the present invention. For example, the aforementioned preferred embodiment exemplifies the structure in which each of the roof supports is preferably divided into the upper support and the lower support. However, the present invention is applicable to a type of vehicle in which a roof support is only composed of the upper support of the aforementioned preferred embodiment. Additionally, in the aforementioned preferred embodiment, the present invention is preferably applied to a type of vehicle provided with two seats. However, the present invention is similarly applicable to a type of vehicle provided with a single or plurality of rear seats in addition to the front seats. Also, the shape of the lateral frames is not limited to the linear shape as described in the aforementioned preferred embodiment. For example, the lateral frames may have a vertically curved shape or a longitudinally curved shape.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An all terrain vehicle comprising:
   a pair of right and left front wheels;
   at least a pair of right and left rear wheels;
   a vehicle body frame arranged to support the front wheels and the rear wheels and to extend in a longitudinal direction of the vehicle, a direction forward in the longitudinal direction being towards a front of the vehicle and a direction rearward in the longitudinal direction being towards a rear of the vehicle;
   a pair of right and left first roof supports, each of the first roof supports including a pipe member extending in a substantially vertical direction of the vehicle, the first roof supports provided at both lateral sides of the vehicle body frame in a transverse direction of the vehicle, respectively;
   a pair of right and left second roof supports, each of the second roof supports including a pipe member extending in the substantially vertical direction of the vehicle, the second roof supports disposed rearward of the first roof supports in the longitudinal direction of the vehicle, the second roof supports provided at both lateral sides of the vehicle body frame in the transverse direction of the vehicle, respectively;
   a pair of right and left roof members, the right roof member connecting an upper portion of the right first roof support and an upper portion of the right second roof support, the left roof member connecting an upper portion of the left first roof support and an upper portion of the left second roof support;
   a seat unit disposed forward of rear ends of the second roof supports in the longitudinal direction of the vehicle;
   a front panel disposed forward of the seat unit in the longitudinal direction of the vehicle, the front panel separating a cabin space and a space positioned above the front wheels;
   an engine unit at least partially disposed under the seat unit, the engine unit including:
      an engine body including a crank shaft, the engine body disposed on a center line through a transverse center of the vehicle; and
      a continuously variable transmission disposed laterally of the engine body in the transverse direction of the vehicle;
   a center console including an inner space, the center console disposed in a transverse center portion of the cabin space, the center console arranged to connect a space positioned forward of the front panel in the longitudinal direction of the vehicle and a space positioned under the seat unit;
   an intake duct arranged to provide external air into an interior of the continuously variable transmission, the intake duct connected to an upper surface of the engine unit, the intake duct arranged to extend forward from the engine unit in the longitudinal direction of the vehicle, the intake duct at least partially disposed in the inner space of the center console; and
   an exhaust duct arranged to discharge air from the interior of the continuously variable transmission to the outside of the vehicle, the exhaust duct connected to the engine unit, the exhaust duct arranged to extend rearward from the engine unit in the longitudinal direction of the vehicle.

2. The all terrain vehicle according to claim 1, wherein the engine body further includes:
   a piston connected to the crank shaft; and
   a cylinder arranged to accommodate the piston;
   the continuously variable transmission includes:
   a driving shaft arranged to rotate with the crank shaft;
   a driven shaft arranged to be rotated by the driving shaft through a belt; and
   a primary pulley supported by the driving shaft; and
   the intake duct and the engine unit are connected at a position between the cylinder and the primary pulley in the transverse direction of the vehicle.

3. The all terrain vehicle according to claim 1, wherein the seat unit includes a right seat and a left seat, and the intake duct and the engine unit are connected at a location between the right seat and the left seat.

4. The all terrain vehicle according to claim 1, wherein the continuously variable transmission includes:
   a driving shaft arranged to rotate with the crank shaft; and
   a driven shaft disposed forward of the driving shaft in the longitudinal direction of the vehicle and arranged to be rotated by the driving shaft through a belt; wherein
   the intake duct and the engine unit are connected at a location between the driving shaft and the driven shaft in the longitudinal direction of the vehicle.

5. The all terrain vehicle according to claim 1, further comprising:
   an engine intake duct arranged to provide external air into an interior of the engine body, wherein the engine body further includes a cylinder portion connected to the engine intake duct and disposed above the crank shaft; wherein
   the engine intake duct and the intake duct overlap one another in a vertical direction inside of the center console.

6. The all terrain vehicle according to claim 1, wherein an inlet of the intake duct is disposed forward of the front panel in the longitudinal direction of the vehicle.

7. The all terrain vehicle according to claim 1, wherein the seat unit includes a seating surface and a seat back, and a height of the center console is higher than a height of the seating surface.

* * * * *